US010534688B2

United States Patent
(12) United States Patent
Kh et al.

(10) Patent No.: US 10,534,688 B2
(45) Date of Patent: Jan. 14, 2020

(54) TRACE HUB LOGIC WITH AUTOMATIC EVENT TRIGGERING

(71) Applicant: INTEL CORPORATION, Santa Clara, CA (US)

(72) Inventors: Brinda Kh, Bangalore (IN); Ravish Kumar, Bangalore (IN); Rajeev Muralidhar, Bangalore (IN)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 15/420,612

(22) Filed: Jan. 31, 2017

(65) Prior Publication Data

US 2018/0095815 A1 Apr. 5, 2018

(51) Int. Cl.

*G06F 11/30* (2006.01)
*G06F 11/34* (2006.01)

(52) U.S. Cl.

CPC ...... *G06F 11/3495* (2013.01); *G06F 11/3072* (2013.01)

(58) Field of Classification Search

CPC ............. G06F 11/3072; G06F 11/0793; G06F 11/0778; G06F 11/0751; G06F 11/0772

See application file for complete search history.

(56) References Cited

U.S. PATENT DOCUMENTS

| | | | | |
|---|---|---|---|---|
| 2004/0227841 A1* | 11/2004 | Houlberg | H04N 5/23212 | 348/345 |
| 2006/0242402 A1* | 10/2006 | Swift | G06F 11/1482 | 713/2 |
| 2008/0215923 A1* | 9/2008 | Bueti | G06F 17/5022 | 714/39 |
| 2011/0289357 A1* | 11/2011 | Shiina | G06F 11/3636 | 714/38.1 |
| 2013/0138783 A1* | 5/2013 | Mallur | G06F 8/63 | 709/221 |
| 2013/0297974 A1* | 11/2013 | Milks | G06F 11/26 | 714/30 |
| 2014/0006870 A1* | 1/2014 | Fryman | G06F 11/079 | 714/37 |

* cited by examiner

*Primary Examiner* — Yolanda L Wilson

(74) *Attorney, Agent, or Firm* — Barnes & Thornburg LLP

(57) ABSTRACT

Technologies for execution trace with automatic event triggering include a computing device that includes an execution trace hub. The trace hub observes execution trace packets and determines whether the execution trace packets match one or more event trigger rules. If an execution packet matches an event trigger rule, the trace hub invokes an event callback. The event callback may be a predefined hardware function of the computing device or a software function. The trace hub may be configured with event trigger rules and associated event callbacks, for example by writing to one or more corresponding configuration space registers. In response to invoking the event callback, the computing device may, for example, output state information of the computing device to a data storage device, halt execution, activate a debug mode of the processor, or execute a software recovery function. Other embodiments are described and claimed.

22 Claims, 3 Drawing Sheets

300

RECEIVE EVENT TRIGGER RULE(S) IDENTIFYING MATCHING TRACE PACKETS (302)
READ CONFIGURATION REGISTER (304)
RECEIVE CALLBACK ASSIGNMENTS FOR EVENT TRIGGER RULES (306)
ENABLE TRACE? (308) NO / YES
START TRACING EXECUTION (310)
OBSERVE TRACE PACKET (312)
MATCH TRACE PACKET AGAINST EVENT TRIGGER RULE(S) (314)
MATCH? (316) NO / YES
INVOKE EVENT CALLBACK ASSIGNED TO EVENT TRIGGER (318)
EXECUTE INVOKED CALLBACK (320)
DUMP CORE (322)
ENABLE DEBUG MODE (324)
POWER OFF/HALT SYSTEM (326)
EXECUTE SW RECOVERY FUNCTION (328)
OUTPUT TRACE PACKET TO DESTINATION (330)

TRACE HUB LOGIC WITH AUTOMATIC EVENT TRIGGERING

CROSS-REFERENCE TO RELATED APPLICATION

The present application claims priority to Indian Provisional patent Application No. 201641033459, entitled "TRACE HUB LOGIC WITH AUTOMATIC EVENT TRIGGERING," which was filed on Sep. 30, 2016.

BACKGROUND

Current computing devices may trace the state of the computer processor or other hardware, firmware, and/or software components of the computing device. A computing device may include trace hardware to collect trace data from various hardware components (e.g., hardware functional blocks interacting via a debug trace fabric), firmware components, and/or software components, encode the trace data into trace packets, and then transmit the trace packets to various trace destinations. The trace packets may be analyzed manually by a user after being collected, for example using a debugger application. Certain computing devices support streaming trace data to a remote host, which may also analyze the trace packets after being collected.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
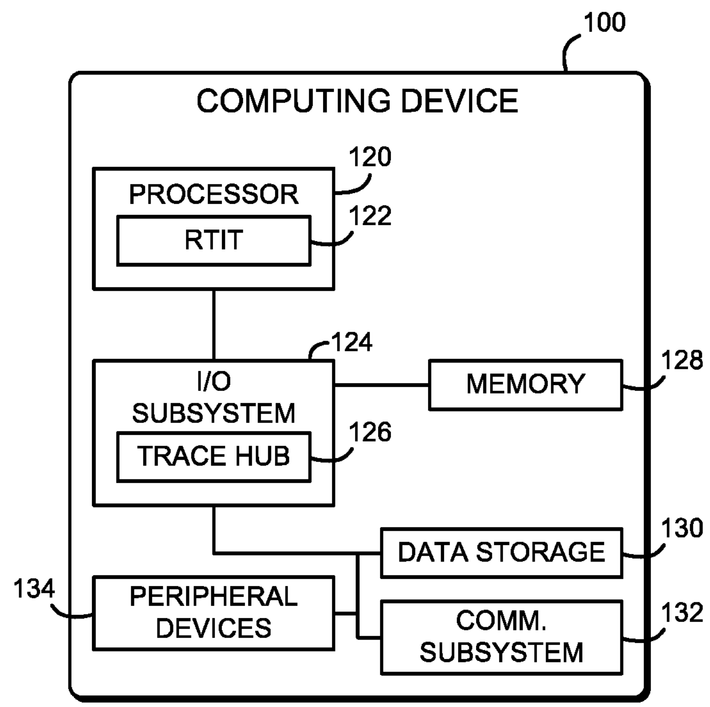
FIG. 1 is a simplified block diagram of at least one embodiment of a computing device with trace hub logic for automatic event triggering.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 with trace hub logic for automatic event triggering includes a processor 120 for executing computer programs. In use, as described further below, the computing device 100 is configured with one or more event trigger rules. Each event trigger rule includes a trace packet matching rule and is associated with an event callback. As the computing device 100 traces execution, trace hub logic matches the event trigger rule against trace packets and in response to a match invokes the assigned event callback. Thus, the computing device 100 may react to events in real time as they are traced, rather than, for example, requiring notification of a user or an external host. Additionally, the computing device 100 may perform automated debugging and/or recovery operations in response to events, without requiring operator intervention or operator presence. By performing automatic packet matching and event triggering, the computing device 100 may be capable of performing more detailed, finer-grained execution tracing without overwhelming the available memory bandwidth or other processing capacity of the computing device 100. Thus, the computing device 100 may allow for improved event tracing, system diagnostics, and/or error recovery.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 124, a memory 128, a data storage device 130, and a communication subsystem 132. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. In some embodiments, the processor 120 may include real-time instruction tracing (RTIT) support 122. The RTIT support 122 may be embodied as any hardware, microcode, firmware, or other components of the processor 120 capable of generating trace data that may be used to reconstruct the control flow executed by the processor 120. The RTIT support 122 may log data packets relating to whether conditional branches are taken or not taken, target addresses of indirect branch instructions, target addresses of mispredicted return instructions, and other data related to control flow. The trace data, in combination with the in-memory image of the executed program, may be used to reconstruct the control flow executed by the processor 120.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. The memory 128 is communicatively coupled to the processor 120 via the I/O subsystem 124, which may be embodied as circuitry and/or components to facilitate input/output operations with the processor 120, the memory 128, and other components of the computing device 100. For example, the I/O subsystem 124 may be embodied as, or otherwise include, memory controller hubs, input/output control hubs, platform controller hubs, an on-chip system fabric, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 128, and other components of the computing device 100, on a single integrated circuit chip.

As shown, the I/O subsystem 124 may include a trace hub 126. The trace hub 126 receives, encodes, and routes trace data generated by various components of the computing device 100. For example, the trace hub 126 may receive and/or encode trace data generated by the RTIT support 122 of the processor 120 as well as trace data generated by firmware, software, hardware functional blocks, peripheral devices 134, or other components of the computing device 100. The trace hub 126 may output the trace data to one or more trace destinations, including the memory 128, peripheral devices 134, and/or remote hosts. The trace hub 126 may be embodied as any hardware functional block, logic, debug trace fabric, or other integrated control circuitry of the I/O subsystem 124 capable of performing the functions described herein. Although illustrated as being included in the I/O subsystem 124, it should be understood that in some embodiments the trace hub 126 may be included in the processor 120, in an SoC, or in another component of the computing device 100.

The data storage device 130 may be embodied as any type of device or devices configured for short-term or long-term storage of data such as, for example, memory devices and circuits, memory cards, hard disk drives, solid-state drives, or other data storage devices. In some embodiments, the data storage device 130 may store trace data, for example trace data generated by the RTIT support 122 of the processor 120 and/or trace data output from the trace hub 126.

The communication subsystem 132 of the computing device 100 may be embodied as any communication circuit, device, or collection thereof, capable of enabling communications between the computing device 100 and other remote devices over a network. The communication subsystem 132 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, microphone, network interface, debug interface, and/or other input/output devices, interface devices, and/or peripheral devices.

Figure 2:
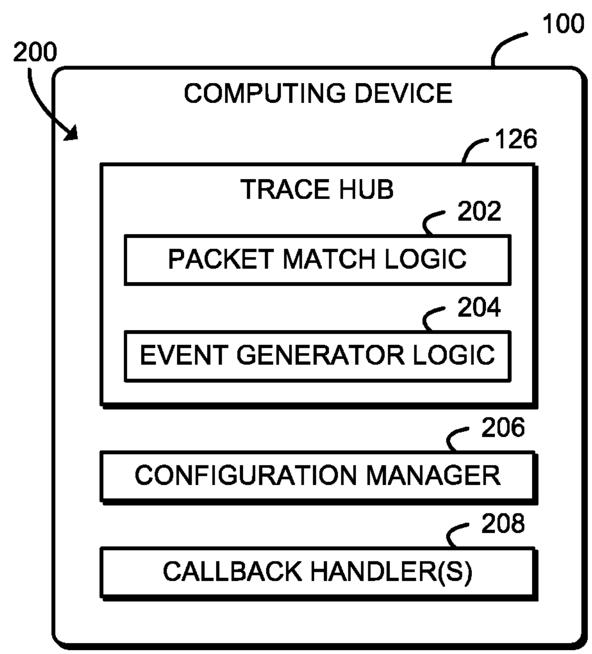
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes packet match logic 202, event generator logic 204, a configuration manager 206, and may include one or more callback handlers 208. The various components of the environment 200 may be embodied as hardware, firmware, software, or a combination thereof. As such, in some embodiments, one or more of the components of the environment 200 may be embodied as circuitry or collection of electrical devices (e.g., packet match circuitry 202, event generator circuitry 204, configuration manager circuitry 206, and/or callback handler circuitry 208). It should be appreciated that, in such embodiments, one or more of the packet match circuitry 202, the event generator circuitry 204, the configuration manager circuitry 206, and/or the callback handler circuitry 208 may form a portion of one or more of the processor 120, the I/O subsystem 124, the trace hub 126, and/or other components of the computing device 100. For example, as shown in the illustrative embodiment of FIG. 2, the packet match logic 202 and the event generator logic 204 form a part of the trace hub 126. Additionally, in some embodiments, one or more of the illustrative components may form a portion of another component and/or one or more of the illustrative components may be independent of one another.

The packet match logic 202 is configured to observe an execution trace packet generated by the computing device 100 and determine whether the execution trace packet matches one or more event trigger rules. Each event trigger rule is indicative of a trace packet matching rule. For example, an event trigger rule may be indicative of a trace source, a trace channel, and a trace event identifier.

The event generator logic 204 is configured to invoke an event callback in response to determining that the execution trace packet matches an event trigger rule. The particular event callback invoked is previously assigned to the matching event trigger rule. The trace hub 126 may output the trace packet to a trace destination after invoking the event callback.

The configuration manager 206 is configured to program the trace hub 126 with the event trigger rule and the event callback assigned to the event trigger rule. The configuration manager 206 may program the trace hub 126 with the event trigger rule and the assigned event callback by writing to one or more appropriate configuration space registers of the computing device 100.

The callback handler 208 may be configured to execute a predefined hardware function of the computing device 100 and/or a software function of the computing device 100 in response to invoking the event callback. For example, the callback handler 208 may be configured to output state information of the computing device 100 to the data storage device 130, halt execution of the computing device 100, activate a debug mode of the processor 120, execute a software recovery function, or enable additional tracing in response to invoking the event callback.

Figure 3:
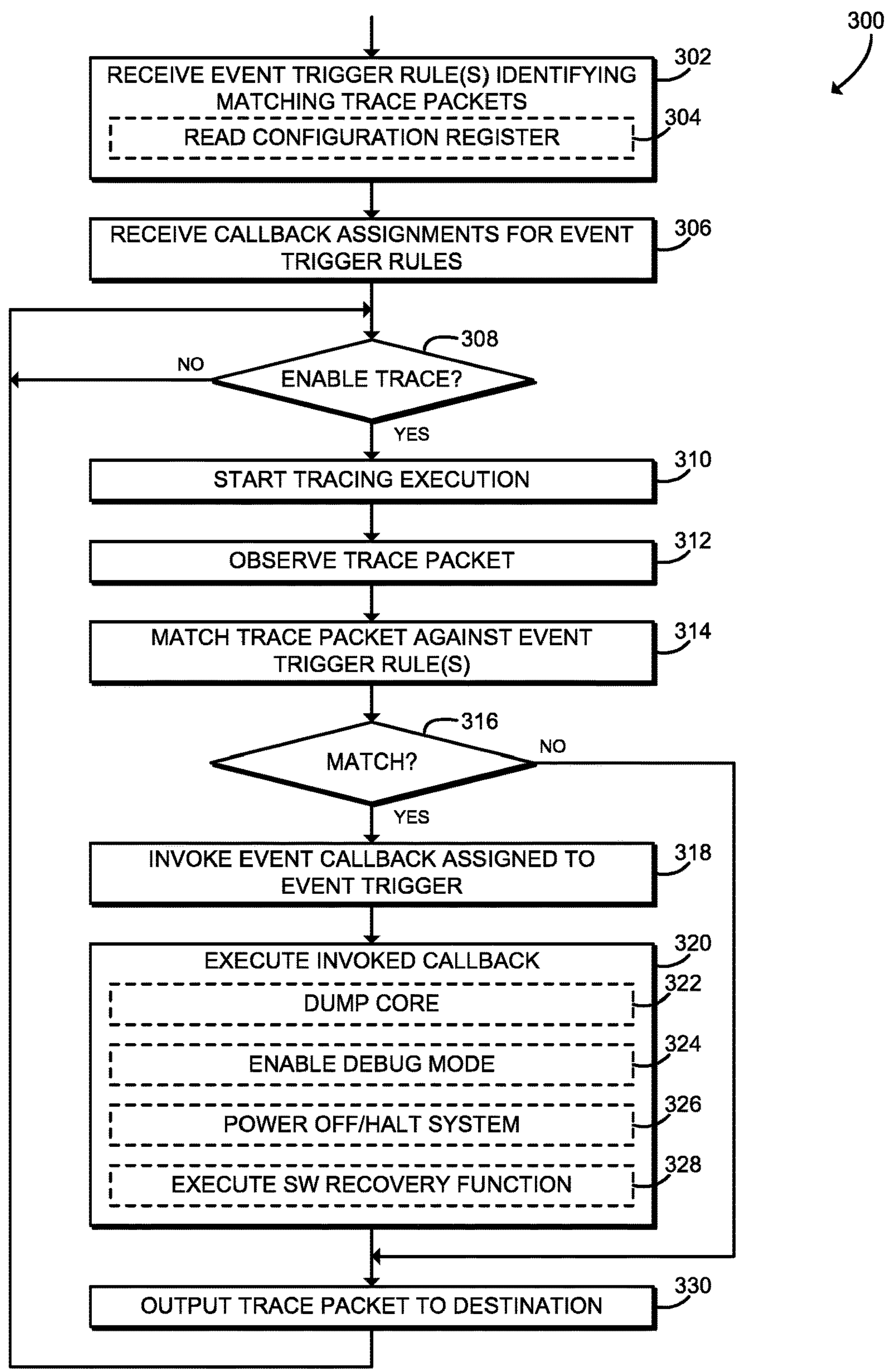
FIG. 3 is a simplified flow diagram of at least one embodiment of a method for trace analysis and automatic event triggering that may be executed by the computing device of FIGS. 1-2.

Referring now to FIG. 3, in use, the computing device 100 may execute a method 300 for trace analysis and automatic event triggering. It should be appreciated that, in some embodiments, the operations of the method 300 may be performed by one or more components of the environment 200 of the computing device 100 as shown in FIG. 2. The method 300 begins in block 302, in which the computing device 100 receives one or more event trigger rules that each identify an associated trace packet matching rule. For example, an event trigger rule may identify a matching trace event source, event channel number, and trace event identifier. The trace event source may be embodied as any hardware, firmware, and/or software component of the computing device 100 that may generate trace packets. The trace event identifier may identify a particular system event type and/or parameters of the trace event. In some embodiments, in block 304, the computing device 100 may read one or more configuration space registers (CSRs) to read the event trigger rules. The CSR may include fields to identify the trace source, trace channel number, event identifier, encoding type, or other parameters of the event trigger rule. The CSRs may be written, for example, by system software of the computing device 100. One potential embodiment of a packet match CSR is described below in connection with FIG. 4.

In block 306, the computing device 100 receives a callback assignment for each of the event trigger rules. The callback assignment defines a predetermined hardware function, software function, or other operation to be performed by the computing device 100 in response to detecting a trace packet that matches the corresponding event trigger rule. For example, the callback may identify a predefined hardware function to be performed by the processor 120, the I/O subsystem 124, or other component of the computing device 100. As another example, the callback may identify a software function, operating system function, firmware function, interrupt, general purpose I/O (GPIO) signal, or other software routine to be executed. Because such software routines may require a functioning software and/or firmware environment, it should be understood that software callbacks may not be appropriate for certain event triggers corresponding to serious system errors, such as a machine check. The computing device 100 may read one or more CSRs to read the callback assignments. The CSR may include fields to identify callback opcode, destination address, and associated data. One potential embodiment of a packet match callback CSR is described below in connection with FIG. 4.

In block 308, the computing device 100 determines whether to enable tracing. Tracing may be enabled, for example, by setting one or more configuration registers, by executing one or more processor instructions, or otherwise configuring the computing device 100 to enable tracing. If the computing device 100 determines not to enable tracing, the method 300 loops back to block 308. If the computing device 100 determines to enable tracing, the method 300 advances to block 310.

In block 310, the computing device 100 starts tracing execution. While tracing is enabled, various components of the computing device 100 such as the RTIT support 122 of the processor 120, hardware functional blocks, and/or firmware components generate trace data based on the current execution state of the computing device 100. The trace data is transmitted through the trace hub 126, which may encode the trace data and forward the trace data to one or more trace destinations as described further below. For example, the trace hub 126 may timestamp and encode the trace data into MIPI system trace protocol (STP) format.

In block 312, the trace hub 126 of the computing device 100 observes a trace packet. The trace hub 126 may, for example, observe each trace packet transmitted via the trace hub 126. In block 314, the trace hub 126 matches the trace packet against one or more event trigger rules that were programmed to the trace hub 126 as described above in connection with block 302. For example, the trace hub 126 may decode the trace packet and determine whether the MIPI source, channel number, and event identifier match those specified by an event trigger rule. As another example, the trace hub 126 may determine whether a checksum of the trace packet matches a checksum specified by an event trigger rule. In block 316, the computing device 100 determines whether the trace packet matches an event trigger rule. If not, the method 300 branches ahead to block 330, described below. If the trace packet matches an event trigger rule, the method 300 advances to block 318.

In block 318, the trace hub 126 invokes an event callback that has been assigned to the event trigger rule. As described above, the event callback may be embodied as a predefined hardware function, software function, or other operation to be performed by the computing device 100. For example, to invoke the event callback the trace hub 126 may send a message with a predetermined opcode to the destination component over a system bus such as an Intel® on-chip system fabric (IOSF).

In block 320, the computing device 100 executes the invoked callback. The computing device 100 may execute any identified hardware function, firmware function, software function, or other event callback that was associated with the event trigger. In many embodiments, the event callback may perform one or more actions for system diagnostics and/or recovery. For example, the computing device 100 may perform one or more operations to assist in debugging the computing device 100 or its components, to recover from errors, or to prevent potential data loss and/or damage.

In some embodiments, in block 322 the computing device 100 may dump core or otherwise save machine state to the data storage device 130 in response to invoking the callback. For example, the computing device 100 may store the register contents of the processor 120, memory contents, stack traces, or other volatile state data to the data storage device 130. The state data may be stored even if operation of the computing device 100 would otherwise be halted or reset, for example in response to a machine check event. The stored data may be used at a later time to analyze the system state at the time of the machine check or other event.

In some embodiments, in block 324 the computing device 100 may enable a debugging mode in response to invoking the callback. For example, the processor 120 may enter a probe mode, an in-circuit emulation mode, or other debugging mode. Again, the debugging mode may be used to analyze the system state at the time of the event.

In some embodiments, in block 326 the computing device 100 may power off or otherwise halt the computing device 100 in response to invoking the callback. The computing device 100 may be powered off in response to detecting an intrusion, unauthorized access, or other event that indicates a potential malicious attack. Powering off or halting the computing device 100 may thus prevent protect the computing device 100 from potential data loss, data access, and/or other damage due to a malicious attack.

In some embodiments, in block 328 the computing device 100 may execute a software recovery function in response to invoking the callback. For example, if the event indicates that a device driver initialization failed, the callback may generate an interrupt and/or a GPIO signal to a custom recovery driver. The recovery driver may re-attempt initialization of the failed device driver or otherwise attempt to recover the computing device 100. As another example, the software recovery function may perform other tasks, such as maintaining a counter of the times the event occurred (e.g., the number of times a firmware workaround was executed).

As an example of one potential embodiment of an event trigger rule and associated callback operations, in some embodiments the trace hub 126 may monitor for machine check packets generated by an SoC power management firmware component (e.g., a PUNIT firmware component). In particular, the event trigger rule may identify the PUNIT firmware as the event source and identify an event ID corresponding to a machine check. In response to matching a machine check packet, the trace hub 126 may invoke an event callback that sends a message to the PUNIT FW to dump the current state machine, the current uncore registers of the processor 120, or other machine state to the data storage device 130. As another example, the event callback may cause the PUNIT FW to enable additional execution traces and/or cause a power management controller (PMC) of the computing device 100 to enable execution tracing.

As another example of a potential embodiment of an event trigger rule and associated callback operations, in some embodiments the trace hub 126 may monitor for trace packets indicating that PMC firmware has hung or is otherwise not responding. For example, the trace hub 126 may monitor for watchdog interrupts generated when the PMC FW fails to handle system bus messages or other inter-process communication messages. In response to hung PMC firmware, the trace hub 126 may invoke an event callback that dumps SSRAM contents, doorbell registers, memory space, and/or other machine state to the data storage device 130. As another example, the event callback may cause the PMC FW, a converged security engine (CSE) firmware, or other firmware component to enable additional execution tracing.

As another example of a potential embodiment of an event trigger rule and associated callback operations, in some embodiments the trace hub 126 may monitor for trace packets with a unique event ID that indicates device driver initialization failed. In response to driver initialization failure, the trace hub 126 may invoke an event callback that generates an interrupt, GPIO event, or other signal to a software driver that performs one or more recovery operations. The driver may, for example, attempt to disable and enable the device, issue one or more PMC commands, reset the device, or otherwise attempt to reload the failed driver.

As another example of a potential embodiment of an event trigger rule and associated callback operations, in some embodiments the trace hub 126 may monitor for trace packets indicating a bugcheck event, stop error, unhandled exception, or other system error. In response to such an event, the trace hub 126 may invoke an event callback that communicates with the PMC to issue a platform reset. As yet another example of a potential embodiment of an event trigger rule and associated callback operations, in some embodiments, the trace hub 126 may monitor for trace packets indicating a firmware workaround was invoked (e.g., a firmware routine that works around hardware errata or other error). In response to invoking the firmware workaround, the trace hub 126 may invoke an event callback that increments a counter to count the number of invocations of the firmware workaround.

Referring back to FIG. 3, after executing the callback in block 320, or after determining that the trace packet does not match an event trigger rule in block 316, the method 300 advances to block 330. In block 330 the trace hub 126 outputs the trace packet to the trace destination. The trace hub 126 may, for example, store the trace packet in the memory 128, output the trace packet to an external USB device, output the trace packet to a boundary scan sideband interface, and/or transmit the trace packet to a remote host, for example using the communication subsystem 132. After outputting the trace packet, the method 300 loops back to block 308, in which the computing device 100 may continue to trace execution.

Figure 4:
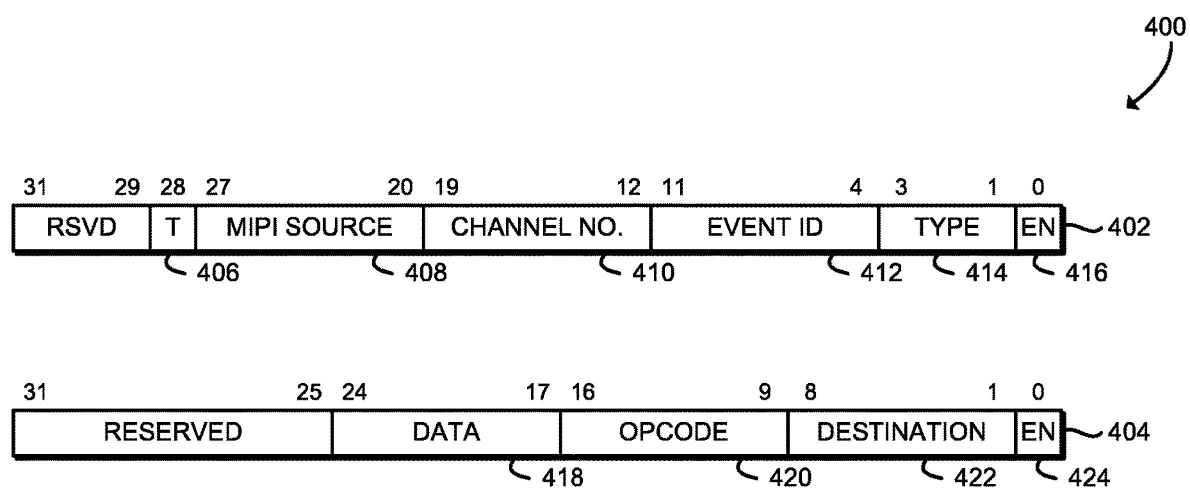
FIG. 4 is a schematic diagram illustrating various configuration space registers that may be supported by the computing device of FIGS. 1-2.

Referring now to FIG. 4, diagram 400 illustrates configuration space registers (CSRs) 402, 404 that may be used to program the trace hub 126. Each CSR 402, 404 may be embodied as a 32-bit register that may be written to by system software in order to identify the event trigger rules and assigned callbacks. Although illustrated as a single pair of registers 402, 404, it should be understood that the computing device 100 may support additional pairs of similar registers to support matching additional event trigger rules. Additionally, it should be understood that the fields in FIG. 4 may not be illustrated to scale.

The packet match register 402 may be configured by system software to enable packet matching. As shown, the packet match register 402 includes a test mode field 406, a MIPI source field 408, a channel number field 410, an event ID field 412, an encode type field 414, and a trigger enable field 416. The test mode field 406 may be set to force event triggers, which may allow the event trigger system to be tested. The MIPI source field 408 and the channel number field 410 may be used to identify the trace source to be matched. The event identifier field 412 may be used to identify a particular trace packet to be matched. In some embodiments, the event identifier field 412 may be replaced by a trace checksum field 412 that also may be used to identify the particular trace packet to be matched. The encode type field 414 specifies the trace packet encoding to be used (e.g., SVEN, ETW, or other supported encoding). The trigger enable field 416 may be set to enable matching the event trigger rule specified by the packet match register 402.

The packet match callback register 404 may be configured by system software to assign a callback operation to the event trigger rule of the corresponding packet match register 402. As shown, the packet match callback register 404 includes a data field 418, an opcode field 420, a destination field 422, and a callback enable field 424. The data field 418 may include data to be supplied as a parameter to the callback. The opcode field 420 may identify a particular hardware function, software function, or other operation to be performed by the callback. The destination field 422 may identify the SB address of the destination hardware component, firmware component, and/or software component. For example, the destination field 422 may identify a destination on an on-chip system fabric of the computing device 100 such as an IOSF. The callback enable field 424 may be set to enable invocation of the callback specified by the packet match callback register 404.

It should be appreciated that, in some embodiments, the method 300 may be embodied as various instructions stored on a computer-readable media, which may be executed by the processor 120, the trace hub 126, and/or other components of the computing device 100 to cause the computing device 100 to perform the method 300. The computer-readable media may be embodied as any type of media capable of being read by the computing device 100 including, but not limited to, the memory 128, the data storage device 130, firmware devices, other memory or data storage devices of the computing device 100, portable media readable by a peripheral device 134 of the computing device 100, and/or other media.

EXAMPLES

Illustrative examples of the technologies disclosed herein are provided below. An embodiment of the technologies may include any one or more, and any combination of, the examples described below.

Example 1 includes a computing device for execution tracing, the computing device comprising an execution trace hub, wherein the execution trace hub comprises: packet match logic to (i) observe an execution trace packet generated by the computing device and (ii) determine whether the execution trace packet matches an event trigger rule in response to observing the execution trace packet, wherein the event trigger rule is indicative of a trace packet matching rule; and event generator logic to (i) invoke an event callback in response to a determination that the execution trace packet matches the event trigger rule, wherein the event callback is assigned to the event trigger rule.

Example 2 includes the subject matter of Example 1, and wherein the event trigger rule is indicative of a trace source, a trace channel, and a trace event identifier.

Example 3 includes the subject matter of any of Examples 1 and 2, and wherein the event identifier of the event trigger rule comprises a machine check identifier.

Example 4 includes the subject matter of any of Examples 1-3, and wherein the event identifier of the event trigger rule comprises a device driver initialization failure identifier.

Example 5 includes the subject matter of any of Examples 1-4, and wherein the trace source of the event trigger rule comprises a hardware component of the computing device, a firmware component of the computing device, or software component of the computing device.

Example 6 includes the subject matter of any of Examples 1-5, and further comprising a configuration manager to: program the execution trace hub with the event trigger rule; and program the execution trace hub with the event callback assigned to the event trigger rule.

Example 7 includes the subject matter of any of Examples 1-6, and wherein to program the execution trace hub with the event trigger rule comprises to write to a first configuration space register of the computing device.

Example 8 includes the subject matter of any of Examples 1-7, and wherein to program the execution trace hub with the event callback comprises to write to a second configuration space register of the computing device.

Example 9 includes the subject matter of any of Examples 1-8, and further comprising a callback handler to execute a predefined hardware function of the computing device in response to invocation of the event callback.

Example 10 includes the subject matter of any of Examples 1-9, and further comprising a callback handler to execute a software function of the computing device in response to invocation of the event callback.

Example 11 includes the subject matter of any of Examples 1-10, and further comprising a callback handler to output state information of the computing device to a data storage device in response to invocation of the event callback.

Example 12 includes the subject matter of any of Examples 1-11, and further comprising a callback handler to halt execution of the computing device in response to invocation of the event callback.

Example 13 includes the subject matter of any of Examples 1-12, and further comprising a callback handler to activate a debug mode of a processor of the computing device in response to invocation of the event callback.

Example 14 includes the subject matter of any of Examples 1-13, and further comprising a callback handler to execute a software recovery function in response to invocation of the event callback.

Example 15 includes the subject matter of any of Examples 1-14, and further comprising a callback handler to enable additional tracing in response to invocation of the event callback.

Example 16 includes a method for execution tracing, the method comprising: observing, by an execution trace hub of a computing device, an execution trace packet generated by the computing device; determining, by the execution trace hub, whether the execution trace packet matches an event trigger rule in response to observing the execution trace packet, wherein the event trigger rule is indicative of a trace packet matching rule; and invoking, by the execution trace hub, an event callback in response to determining that the execution trace packet matches the event trigger rule, wherein the event callback is assigned to the event trigger rule.

Example 17 includes the subject matter of Example 16, and wherein the event trigger rule is indicative of a trace source, a trace channel, and a trace event identifier.

Example 18 includes the subject matter of any of Examples 16 and 17, and wherein the event identifier of the event trigger rule comprises a machine check identifier.

Example 19 includes the subject matter of any of Examples 16-18, and wherein the event identifier of the event trigger rule comprises a device driver initialization failure identifier.

Example 20 includes the subject matter of any of Examples 16-19, and wherein the trace source of the event trigger rule comprises a hardware component of the computing device, a firmware component of the computing device, or software component of the computing device.

Example 21 includes the subject matter of any of Examples 16-20, and further comprising: programming, by the computing device, the execution trace hub with the event trigger rule; and programming, by the computing device, the execution trace hub with the event callback assigned to the event trigger rule.

Example 22 includes the subject matter of any of Examples 16-21, and wherein programming the execution trace hub with the event trigger rule comprises writing to a first configuration space register of the computing device.

Example 23 includes the subject matter of any of Examples 16-22, and wherein programming the execution trace hub with the event callback comprises writing to a second configuration space register of the computing device.

Example 24 includes the subject matter of any of Examples 16-23, and further comprising executing, by the computing device, a predefined hardware function of the computing device in response to invoking the event callback.

Example 25 includes the subject matter of any of Examples 16-24, and further comprising executing, by the computing device, a software function of the computing device in response to invoking the event callback.

Example 26 includes the subject matter of any of Examples 16-25, and further comprising outputting, by the computing device, state information of the computing device to a data storage device in response to invoking the event callback.

Example 27 includes the subject matter of any of Examples 16-26, and further comprising halting, by the computing device, execution of the computing device in response to invoking the event callback.

Example 28 includes the subject matter of any of Examples 16-27, and further comprising activating, by the computing device, a debug mode of a processor of the computing device in response to invoking the event callback.

Example 29 includes the subject matter of any of Examples 16-28, and further comprising executing, by the computing device, a software recovery function in response to invoking the event callback.

Example 30 includes the subject matter of any of Examples 16-29, and further comprising enabling, by the computing device, additional tracing in response to invoking the event callback.

Example 31 includes a computing device comprising: a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for execution tracing, the computing device comprising: means for observing, by an execution trace hub of the computing device, an execution trace packet generated by the computing device; means for determining, by the execution trace hub, whether the execution trace packet matches an event trigger rule in response to observing the execution trace packet, wherein the event trigger rule is indicative of a trace packet matching rule; and means for invoking, by the execution trace hub, an event callback in response to determining that the execution trace packet matches the event trigger rule, wherein the event callback is assigned to the event trigger rule.

Example 35 includes the subject matter of Example 34, and wherein the event trigger rule is indicative of a trace source, a trace channel, and a trace event identifier.

Example 36 includes the subject matter of any of Examples 34 and 35, and wherein the event identifier of the event trigger rule comprises a machine check identifier.

Example 37 includes the subject matter of any of Examples 34-36, and wherein the event identifier of the event trigger rule comprises a device driver initialization failure identifier.

Example 38 includes the subject matter of any of Examples 34-37, and wherein the trace source of the event trigger rule comprises a hardware component of the computing device, a firmware component of the computing device, or software component of the computing device.

Example 39 includes the subject matter of any of Examples 34-38, and further comprising: means for programming the execution trace hub with the event trigger rule; and means for programming the execution trace hub with the event callback assigned to the event trigger rule.

Example 40 includes the subject matter of any of Examples 34-39, and wherein the means for programming the execution trace hub with the event trigger rule comprises means for writing to a first configuration space register of the computing device.

Example 41 includes the subject matter of any of Examples 34-40, and wherein the means for programming the execution trace hub with the event callback comprises means for writing to a second configuration space register of the computing device.

Example 42 includes the subject matter of any of Examples 34-41, and further comprising means for executing a predefined hardware function of the computing device in response to invoking the event callback.

Example 43 includes the subject matter of any of Examples 34-42, and further comprising means for executing, a software function of the computing device in response to invoking the event callback.

Example 44 includes the subject matter of any of Examples 34-43, and further comprising means for outputting state information of the computing device to a data storage device in response to invoking the event callback.

Example 45 includes the subject matter of any of Examples 34-44, and further comprising means for halting execution of the computing device in response to invoking the event callback.

Example 46 includes the subject matter of any of Examples 34-45, and further comprising means for activating a debug mode of a processor of the computing device in response to invoking the event callback.

Example 47 includes the subject matter of any of Examples 34-46, and further comprising means for executing a software recovery function in response to invoking the event callback.

Example 48 includes the subject matter of any of Examples 34-47, and further comprising means for enabling additional tracing in response to invoking the event callback.

The invention claimed is:

1. A computing device for execution tracing, the computing device comprising an execution trace hub, wherein the execution trace hub comprises:

packet match logic to (i) observe an execution trace packet generated by the computing device and (ii) determine whether the execution trace packet matches an event trigger rule in response to observing the execution trace packet, wherein the event trigger rule is indicative of a trace packet matching rule that includes a trace source, a trace channel, and a trace event identifier; and event generator logic to (i) invoke an event callback in response to a determination that the execution trace packet matches the event trigger rule, wherein the event callback is assigned to the event trigger rule.

2. The computing device of claim 1, wherein the event identifier of the event trigger rule comprises a machine check identifier.

3. The computing device of claim 1, wherein the event identifier of the event trigger rule comprises a device driver initialization failure identifier.

4. The computing device of claim 1, wherein the trace source of the event trigger rule comprises a hardware component of the computing device, a firmware component of the computing device, or software component of the computing device.

5. The computing device of claim 1, further comprising a configuration manager to:

program the execution trace hub with the event trigger rule; and program the execution trace hub with the event callback assigned to the event trigger rule.

6. The computing device of claim 5, wherein to program the execution trace hub with the event trigger rule comprises to write to a first configuration space register of the computing device.

7. The computing device of claim 1, further comprising a callback handler to execute a predefined hardware function of the computing device in response to invocation of the event callback.

8. The computing device of claim 1, further comprising a callback handler to execute a software function of the computing device in response to invocation of the event callback.

9. The computing device of claim 1, further comprising a callback handler to output state information of the computing device to a data storage device in response to invocation of the event callback.

10. The computing device of claim 1, further comprising a callback handler to halt execution of the computing device in response to invocation of the event callback.

11. The computing device of claim 1, further comprising a callback handler to activate a debug mode of a processor of the computing device in response to invocation of the event callback.

12. The computing device of claim 1, further comprising a callback handler to execute a software recovery function in response to invocation of the event callback.

13. A method for execution tracing, the method comprising:

observing, by an execution trace hub of a computing device, an execution trace packet generated by the computing device;

determining, by the execution trace hub, whether the execution trace packet matches an event trigger rule in response to observing the execution trace packet, wherein the event trigger rule is indicative of a trace packet matching rule that includes a trace source, a trace channel, and a trace event identifier; and invoking, by the execution trace hub, an event callback in response to determining that the execution trace packet matches the event trigger rule, wherein the event callback is assigned to the event trigger rule.

14. The method of claim 13, wherein the trace source of the event trigger rule comprises a hardware component of the computing device, a firmware component of the computing device, or software component of the computing device.

15. The method of claim 13, further comprising:

programming, by the computing device, the execution trace hub with the event trigger rule; and programming, by the computing device, the execution trace hub with the event callback assigned to the event trigger rule.

16. The method of claim 13, further comprising executing, by the computing device, a predefined hardware function of the computing device in response to invoking the event callback.

17. The method of claim 13, further comprising executing, by the computing device, a software function of the computing device in response to invoking the event callback.

18. One or more computer-readable storage media comprising a plurality of instructions that in response to being executed cause a computing device to:

observe, by an execution trace hub of the computing device, an execution trace packet generated by the computing device;

determine, by the execution trace hub, whether the execution trace packet matches an event trigger rule in response to observing the execution trace packet, wherein the event trigger rule is indicative of a trace packet matching rule that includes a trace source, a trace channel, and a trace event identifier; and invoke, by the execution trace hub, an event callback in response to determining that the execution trace packet matches the event trigger rule, wherein the event callback is assigned to the event trigger rule.

19. The one or more computer-readable storage media of claim 18, wherein the trace source of the event trigger rule comprises a hardware component of the computing device, a firmware component of the computing device, or software component of the computing device.

20. The one or more computer-readable storage media of claim 18, further comprising a plurality of instructions that in response to being executed cause the computing device to:

program the execution trace hub with the event trigger rule; and program the execution trace hub with the event callback assigned to the event trigger rule.

21. The one or more computer-readable storage media of claim 18, further comprising a plurality of instructions that in response to being executed cause the computing device to execute a predefined hardware function of the computing device in response to invoking the event callback.

22. The one or more computer-readable storage media of claim 18, further comprising a plurality of instructions that in response to being executed cause the computing device to execute a software function of the computing device in response to invoking the event callback.

* * * * *